Patented Jan. 13, 1931

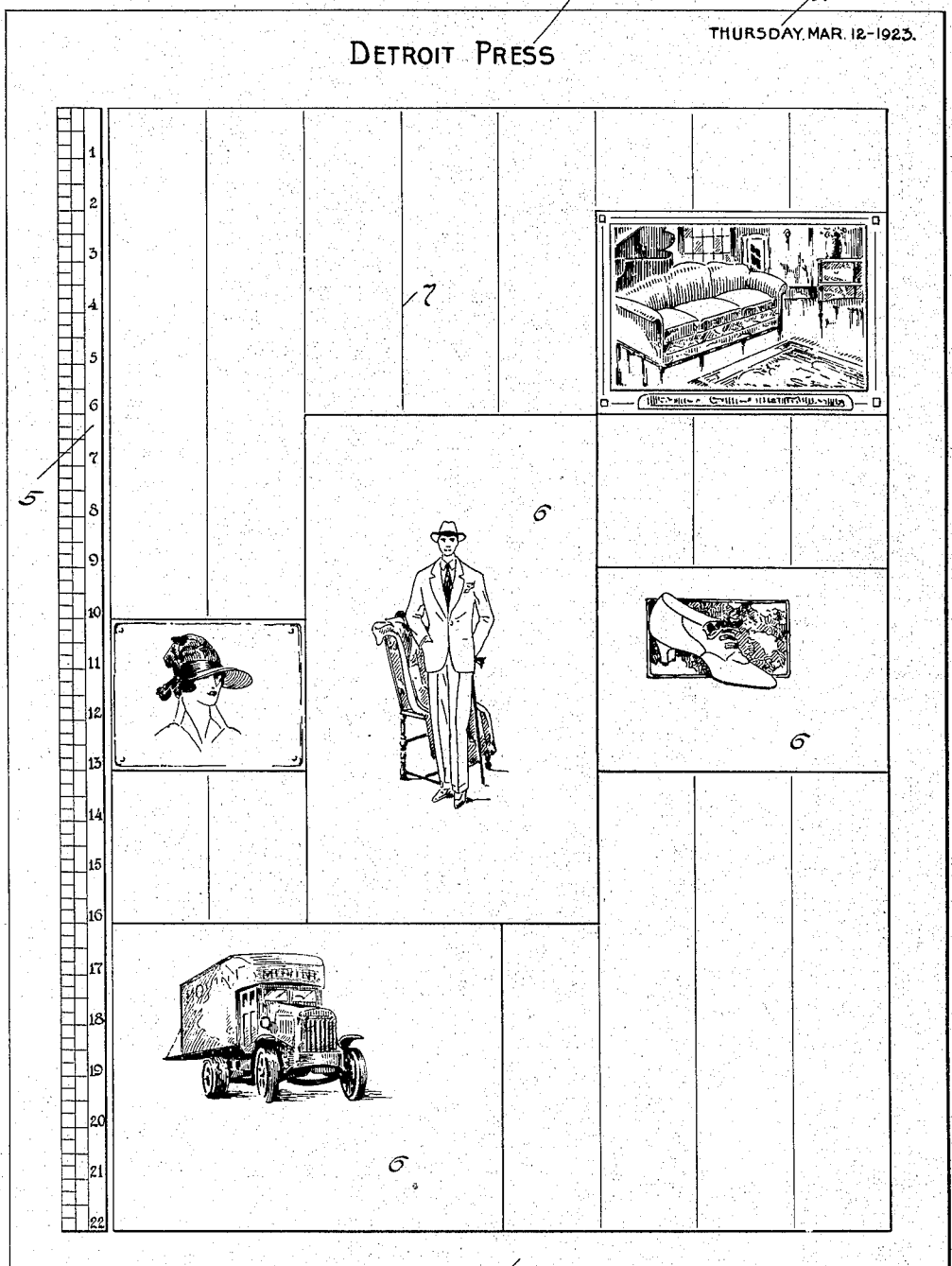

1,788,421

UNITED STATES PATENT OFFICE

FREDERICK C. COOPER, OF DETROIT, MICHIGAN, ASSIGNOR TO COMMERCIAL REPRODUCING COMPANY, OF DETROIT, MICHIGAN, A CORPORATION

PRINTED MATTER FOR FILE PURPOSES

Application filed June 5, 1925. Serial No. 35,065.

Department stores and other community houses use considerable newspaper space for advertising purposes. Sometimes a whole page and at other times advertisements are distributed about a page or on a number of pages. The advertising is ordinarily handled by a store official or by some newspaper advertising agency and in either instance a record is maintained of the number of square inches of advertising used so that accounts may be settled for each month. It is the present practice to maintain a complete file of all the newspapers containing the advertisements, and consequently such a file is bulky, occupies considerable space, and is not at all convenient for a filing system. Furthermore, a scale must be used to measure the advertisements distributed about a page to ascertain the total advertising space. This cannot be accomplished at a glance but requires some maneuvering of the scale to compute the exact space.

My invention aims to provide a method of maintaining a newspaper file record by which the size of such file is reduced for easily handling a rapid calculation as to the amount of advertising. The method involves the placing of a scale along the side edge of a newspaper sheet, and then making a reduced photostat or rectigraph print, of the sheet and scale so that the photostat may be placed in a loose leaf binder or filed away for future reference. With the scale reproduced along with the newspaper sheet a photostat is made which enables a person to measure accurately the exact length of the space being used, since the scale is reduced in exact proportion with the newspaper page, and since a newspaper page has a known number of columns, each of a prescribed width, it is an easy matter to ascertain the length of each advertisement and the width thereof. By reproducing on a smaller scale, a newspaper page, the title and date of the page is retained and it is on the reduced copy that a record may be placed as to the amount of advertising, per page, so that at the end of a month it is an extremely easy matter to calculate the total advertising for a month.

When advertisements of a firm or individual are scattered throughout a newspaper, the small advertisement can be cut out and pasted or otherwise secured to one of the pages so that when the page is reproduced there will be a copy of all the advertisements. In arranging the separated advertisements on a page for reproduction purposes, the advertisements may be arranged according to the columns and in proximity to the scale, so that the total amount of advertising on a reduced copy can be easily and quickly calculated. The reproduction may constitute a proof sheet and positive evidence of the amount of newspaper space used, and all of this is accomplished without maintaining large cumbersome newspaper files.

My invention will be hereinafter specifically described and then claimed, and reference will now be had to the drawings showing a plan of a photostat adapted to form part of a file.

The reference numeral 1 denotes a page taken from a newspaper which ordinarily has its name 2 at the top of the page and its date of issue 4. If such name and date do not appear on the advertising page, it can be easily stamped or otherwise marked thereon for identification purposes. The date is preferably placed in the upper right hand corner so as to be easily observed when reproduced for filing purposes.

If the entire page is devoted to a single advertisement, a scale or measuring instrumentality 5 is placed on the edge of the page with the upper end of the scale alining with the upper edge of the advertisement and it is from this scale that the depth of the advertisement can be quickly ascertained, while the width of the advertisement is known from the number of columns ordinarily used by the newspaper publisher.

If one or more advertisements 6 for a firm or individual are distributed about the page the column 7 on the page will give the width of the advertisement at a glance, and then it is only necessary to ascertain the length of the advertisement by comparison with the scale.

If advertisements for a firm or individual are distributed throughout a newspaper they can be cut out and assembled all on one page, preferably a page containing the largest advertisement or the largest number of advertisements. The cut out advertisements are assembled as close to the scale as possible and may be adhesively or otherwise secured to the page so as to remain in place while the page is being reproduced.

The above having been performed in either instance the page with its scale at one side is reproduced on a smaller scale so as to provide a photostat or similar reproduction. As a result there is a sheet or page that can be easily handled, and filed in a loose leaf binder of ordinary book size, thus providing a convenient record from which computations may be made from time to time, to ascertain the extent and cost of advertising for a period of time. The photostats constitute positive evidence of the size and nature of advertisements and since there is a scale on each photostat it is unnecessary for the advertising department to scale each page reproduced. The amount of advertising can be ascertained at a glance and in eliminating large newspaper files I have provided a better filing system than that now in use.

My method of measuring and maintaining a file record of printed matter is applicable to large magazine pages, reading matter and illustrations and when such printed matter is of irregular shape, blank pages with column demarcations thereon may be utilized for photographic purposes, the printed matter being arranged as near as possible in column formation, adjacent the scale, so that the exact space may be easily computed.

What I claim is:—

As a means for preserving a record of the advertising activities of an advertiser as presented in the public press for record and accounting purposes, a photographically-produced sheet which presents dimension and other characteristics of a complete page of a press publication, with the page presenting the advertising matter of the advertiser found in the publication issue having the date on which the advertising matter appears, with such advertising matter positioned relative to the column delineations of the page and regardless of the actual position of the advertisement on the page of the publication on which the advertisement actually appears, thereby permitting the column delineations to indicate the width in columns of the advertising matter, said sheet also presenting a column-length dimension indicator positioned parallel and in proximity to the outer side of an outer column of the page, the indicator having standard dimension characteristics with respect to the page being photographed, the record sheet having dimensions materially less than the dimensions of the page, whereby the record sheet will present the characteristics of the advertising matter of the issue as to content and dimensions and within the page characteristics of the particular publication carrying the advertising matter, and whereby the record and accounting data of the publication issue will be presented on a single sheet of diminutive size.

In testimony whereof I affix my signature.

FREDERICK C. COOPER.